(12) United States Patent
Park et al.

(10) Patent No.: US 10,242,921 B2
(45) Date of Patent: Mar. 26, 2019

(54) METHOD OF FORMING PATTERN OF SEMICONDUCTOR DEVICE FROM WHICH VARIOUS TYPES OF PATTERN DEFECTS ARE REMOVED

(71) Applicant: SAMSUNG ELECTRONICS CO., LTD., Suwon-si, Gyeonggi-do (KR)

(72) Inventors: Sang-Wook Park, Hwaseong-si (KR); Heung-Kook Ko, Hwaseong-si (KR); No-Young Chung, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 138 days.

(21) Appl. No.: 15/355,193

(22) Filed: Nov. 18, 2016

(65) Prior Publication Data
US 2017/0148689 A1    May 25, 2017

(30) Foreign Application Priority Data
Nov. 20, 2015 (KR) .................. 10-2015-0163347

(51) Int. Cl.
*G06F 17/50* (2006.01)
*H01L 21/66* (2006.01)
(Continued)

(52) U.S. Cl.
CPC .......... *H01L 22/12* (2013.01); *G06F 17/5081* (2013.01); *G06K 9/00536* (2013.01);
(Continued)

(58) Field of Classification Search
CPC .. G06F 17/5081; G06F 19/00; G06F 2217/12; G60K 9/00536; G60K 9/52; G06T 7/004; G06T 2207/30148; H01L 21/0274
(Continued)

(56) References Cited

U.S. PATENT DOCUMENTS 7,512,927 B2    3/2009   Gallatin et al.
7,765,021 B2    7/2010   Mansfield et al.
(Continued)

FOREIGN PATENT DOCUMENTS

JP    09133638 A  *  5/1997
JP    11344450 A  * 12/1999
(Continued)

*Primary Examiner* — Phallaka Kik
(74) *Attorney, Agent, or Firm* — F. Chau & Associates, LLC

(57) ABSTRACT

The method includes classifying sample pattern data into a standard normal group and a standard weak group based on a first criterion. The method further includes extracting a normal group determination function by calculating an image parameter with respect to each piece of sample pattern data included in the standard normal group, and extracting a weak group determination function by calculating the image parameter with respect to each piece of sample pattern data included in the standard weak group. The method also includes classifying the object pattern data into a normal group and a weak group by calculating the image parameter with respect to object pattern data based on a first proximity between the normal group determination function and the object pattern data and a second proximity between the weak group determination function and the object pattern data.

19 Claims, 11 Drawing Sheets

(51) Int. Cl.
  *G06T 7/00* (2017.01)
  *G06K 9/00* (2006.01)
  *H01L 21/027* (2006.01)
  *G06K 9/52* (2006.01)
  *G06F 19/00* (2018.01)

(52) U.S. Cl.
  CPC .............. *G06K 9/52* (2013.01); *G06T 7/0004* (2013.01); *H01L 21/0274* (2013.01); *G06F 19/00* (2013.01); *G06F 2217/12* (2013.01); *G06T 2207/30148* (2013.01)

(58) Field of Classification Search
  USPC ........ 716/54, 52, 53, 55, 112; 700/110, 121; 382/144, 149, 154
  See application file for complete search history.

(56) References Cited

U.S. PATENT DOCUMENTS

| | | | |
|---|---|---|---|
| 7,900,169 B2 | 3/2011 | Abdo | |
| 7,953,249 B2 * | 5/2011 | Mertens | G01J 3/46 382/112 |
| 8,059,884 B2 | 11/2011 | Mukherjee et al. | |
| 8,174,681 B2 | 5/2012 | Graur et al. | |
| 8,302,035 B2 | 10/2012 | Choi | |
| 8,572,524 B2 | 10/2013 | Zhou et al. | |
| 8,984,450 B2 | 3/2015 | Hu et al. | |
| 8,997,027 B2 | 3/2015 | Hamouda et al. | |
| 2005/0059876 A1 * | 3/2005 | Krishnan | G06T 7/0012 600/407 |
| 2005/0232476 A1 * | 10/2005 | Hayakawa | G09G 3/006 382/141 |
| 2013/0177232 A1 * | 7/2013 | Hirano | G06T 7/0004 382/141 |
| 2014/0033145 A1 * | 1/2014 | Feng | G03F 1/144 716/54 |
| 2017/0154235 A1 * | 6/2017 | Morard | G06K 9/4647 |

FOREIGN PATENT DOCUMENTS

| | | | |
|---|---|---|---|
| JP | 2003317083 A | * | 11/2003 |
| JP | 2013-217940 | | 10/2013 |
| KR | 10-2014-7015035 | | 6/2014 |

* cited by examiner

METHOD OF FORMING PATTERN OF SEMICONDUCTOR DEVICE FROM WHICH VARIOUS TYPES OF PATTERN DEFECTS ARE REMOVED

CROSS-REFERENCE TO RELATED APPLICATION

This application claims priority under 35 USC § 119 to Korean Patent Application No. 10-2015-0163347, filed on Nov. 20, 2015, in the Korean Intellectual Property Office, the disclosure of which is incorporated by reference herein in its entirety.

TECHNICAL FIELD

Exemplary embodiments of the present inventive concept relate to a method of forming a pattern of a semiconductor device, and more particularly, to a method of forming a pattern of a semiconductor device from which various types of pattern defects are removed.

DISCUSSION OF THE RELATED ART

As a degree of integration of semiconductor devices has become even higher, sizes and intervals of patterns of circuits have gradually decreased. Thus, techniques of compensating for a difference between a designed pattern and an actually manufactured pattern are currently being researched.

SUMMARY

According to an exemplary embodiment of the present inventive concept, a method includes classifying sample pattern data into a standard normal group and a standard weak group based on a first criterion. The method further includes extracting a normal group determination function by calculating an image parameter with respect to each piece of sample pattern data included in the standard normal group, and extracting a weak group determination function by calculating the image parameter with respect to each piece of sample pattern data included in the standard weak group. The method also includes classifying an object pattern data into a normal group and a weak group by calculating the image parameter with respect to object pattern data based on a first proximity between the normal group determination function and the object pattern data and a second proximity between the weak group determination function and the object pattern data.

According to an exemplary embodiment of the present inventive concept, a method includes classifying sample pattern data into a standard normal group and a standard weak group based on a first criterion. The method includes removing pattern data with a low defect probability from sample patterns included in the standard normal group and the standard weak group. The method further includes respectively extracting a normal group determination function and a weak group determination function based on image parameters from the standard normal group and the standard weak group. The method also includes respectively calculating a first matching degree between the standard normal group and a normal group and a second matching degree between the standard weak group and a weak group, by classifying the sample pattern data into a normal group and a weak group based on the normal group determination function and the weak group determination function. The method further includes reclassifying a standard normal group and a standard weak group based on a second criterion that is different from the first criterion and reextracting a normal group determination function and a weak group determination function from the reclassified standard normal group and the reclassified standard weak group when the first and second matching degrees is less than a preset criterion. The method additionally includes performing optical rule checking (ORC) on object pattern data, on which optical proximity correction (OPC) is performed, and selecting preliminary weak pattern data. The method also includes classifying the preliminary weak pattern data into a normal group and a weak group based on a proximity between the normal group determination function and the preliminary weak pattern data and a proximity between the weak group determination function and the preliminary weak pattern data by calculating the image parameter with respect to the preliminary weak pattern data. The method additionally includes, forming a preliminary photomask based on the object pattern data, and forming an object pattern on a wafer by using the preliminary photomask. The method further includes attesting each weak pattern included in the weak group from among the object pattern formed on the wafer for a defect. The method also includes correcting object pattern data based on the testing.

According to an exemplary embodiment of the present inventive concept, a method includes testing appropriateness of object pattern data. The method also includes classifying sample pattern data into a standard normal group and a standard weak group based on a first criterion. The method also includes, extracting a normal group determination function by calculating an image parameter with respect to each piece of sample pattern data included in the standard normal group, and extracting a weak group determination function by calculating the image parameter with respect to each piece of sample pattern data included in the standard weak group. The method further includes, performing optical rule checking (ORC) on object pattern data, on which optical proximity correction (OPC) is performed to select preliminary weak pattern data. The method also includes reclassifying an preliminary weak pattern data into a normal group and a weak group based on a proximity between the normal group determination function and the preliminary weak pattern data and a proximity between the weak group determination function and the preliminary weak pattern data by calculating the image parameter with respect to the preliminary weak pattern data. The method further includes determining whether the weak patterns have a defect, wherein when there is no defect in the object patterns, a preliminary photomask is confirmed, and when there is a defect in the object patterns, the object pattern based on the object patterns having the defect are corrected.

BRIEF DESCRIPTION OF THE DRAWINGS

The above and other features of the inventive concept will become more apparent by describing in detail exemplary embodiments thereof, with reference to the accompanying drawing, which.

DETAILED DESCRIPTION OF THE EMBODIMENTS

Exemplary embodiments of the present inventive concept will now be described in more detail below with reference to the accompanying drawings, in which exemplary embodiments of the present inventive concept are shown. The inventive concept may have many different forms of exemplary embodiments and should not be construed as being limited to the exemplary embodiments set forth herein.

Expressions such as "at least one of," when preceding a list of elements, modify the entire list of elements and do not modify the individual elements of the list.

Figure 1:
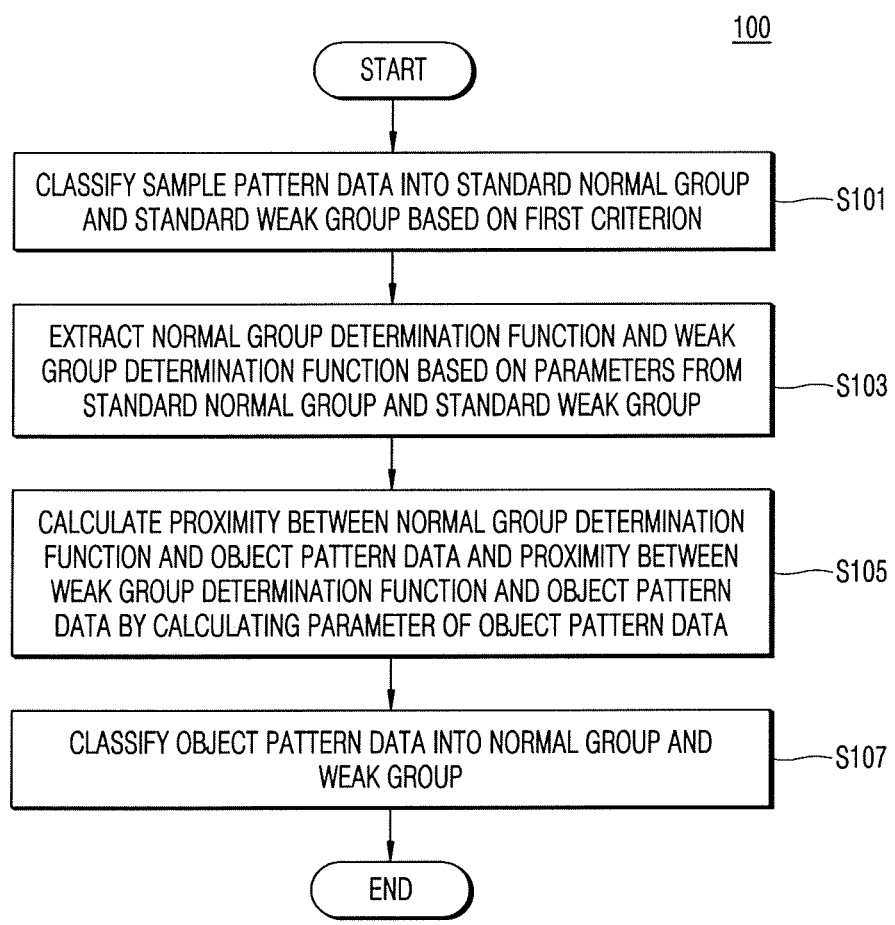
FIG. 1 is a flowchart of a method of forming a pattern of a semiconductor device according to exemplary embodiments of the present inventive concept.
Figure 2:
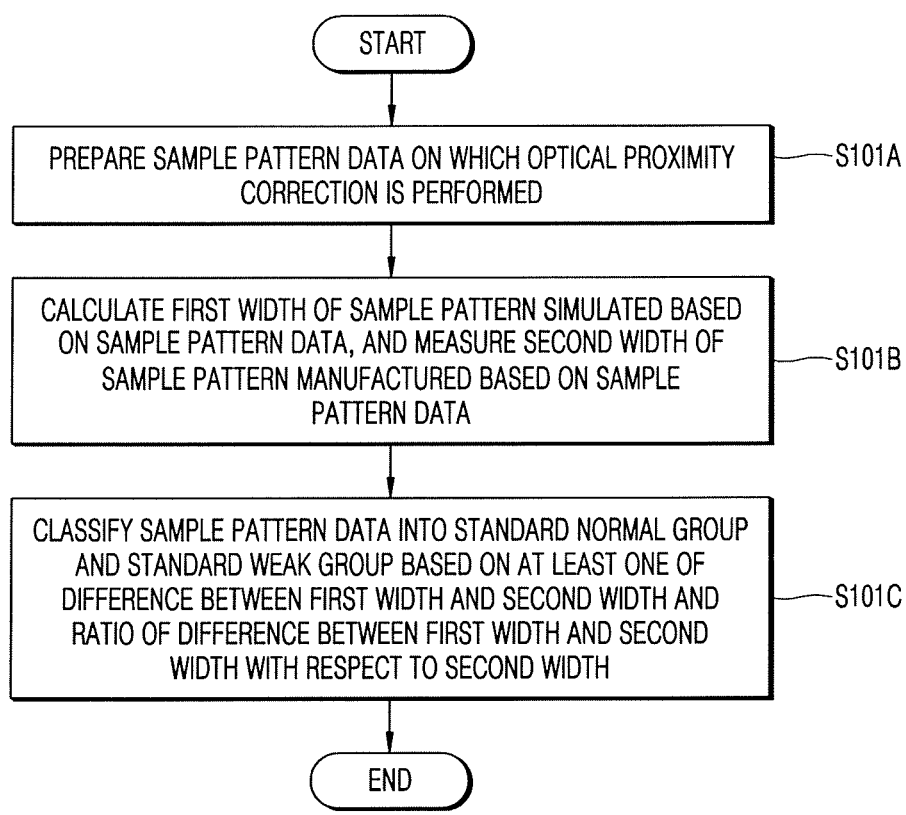
FIG. 2 is a flowchart of an operation of classifying sample pattern data of FIG. 1 into a standard normal group and a standard weak group according to exemplary embodiments of the present inventive concept.
Figure 3:
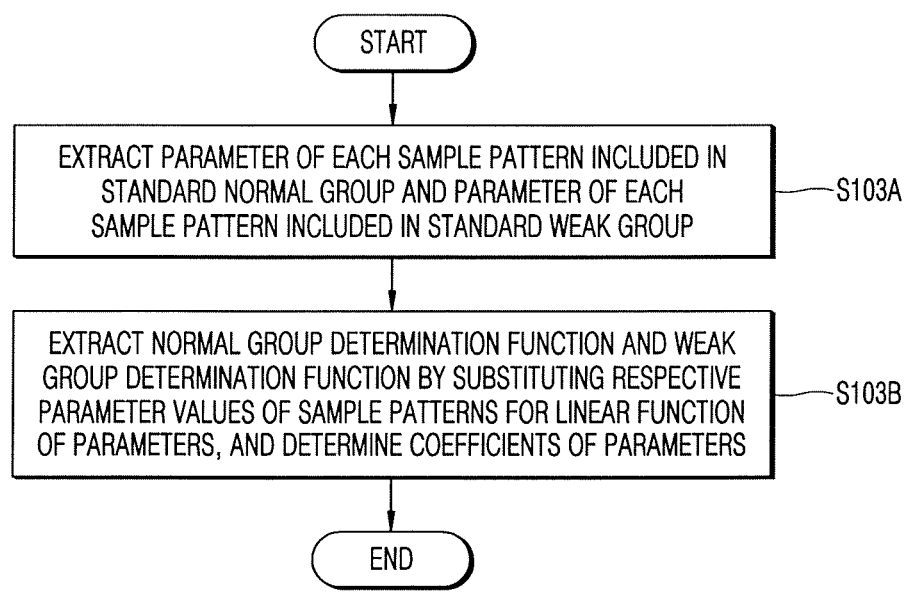
FIG. 3 is a flowchart of an operation of calculating a normal group determining function and a weak group determination function of FIG. 1 according to exemplary embodiments of the present inventive concept.

FIG. 1 is a flowchart of a method 100 of forming a pattern of a semiconductor device according to exemplary embodiments of the present inventive concept. The method 100 of forming a pattern of a semiconductor device may include a method of extracting various weak patterns having a high defect probability from among object patterns of the semiconductor device in advance. FIG. 2 is a flowchart of a method of classifying sample pattern data of FIG. 1 into a standard normal group and a standard weak group according to exemplary embodiments of the present inventive concept. FIG. 3 is a flowchart of a method of extracting a normal group determining function and a weak group determination function of FIG. 1 according to exemplary embodiments of the present inventive concept.

Referring to FIG. 1, the method 100 of forming a pattern of a semiconductor device may include operations S101 and S103 of modeling an analysis model for extracting a weak pattern from a predetermined pattern and operations S105 and S107 of extracting a weak pattern from an object pattern by using the analysis model.

The operations S101 and S103 of modeling an analysis model for extracting a weak pattern may include an operation S101 of classifying sample pattern data into a standard normal group and a standard weak group and an operation S103 of extracting a normal group determination function and a weak group determination function based on parameters of the standard normal group and the standard weak group, respectively.

For example, sample pattern data may be classified into a standard normal group and a standard weak group based on a first criterion in operation S101. The sample pattern data may be data including a predetermined pattern for extracting a weak pattern. The sample pattern data may be data designed based on Electronic Design Automation (EDA), Computer Aided Design (CAD), or other integrated circuit design software.

Referring also to FIG. 2, the sample pattern data may be data on which optical proximity correction (OPC) is performed (S101A). The OPC is performed to compensate for pattern distortion due to light diffraction when performing a photolithography process. The sample pattern data may be designed to have a shape that is intentionally modified from a target pattern. Thus, the optical proximity corrected (OPCed) sample pattern data may have pattern shapes of a target pattern to or from which small patterns of a sub-resolution are added or removed. For example, besides the forming of target patterns on the sample pattern data, a calibration process of the OPC such as line end treatment or insertion of scattering bar may be performed on the sample pattern data. Line end treatment refers to a method of adding a corner Serif pattern or a hammer pattern to overcome the problem that line ends of line patterns are rounded. Insertion of scattering bars may be adding a plurality of sub-resolution scattering bars around a target pattern to minimize variation in line widths due to a pattern density.

When OPCed sample data patterns are prepared, the sample pattern data may be classified into a standard normal group and a standard weak group based on the first criterion based on which a defect probability of patterns may be predicted in operations S101B and S101C according to exemplary embodiments of the present inventive concept. For example, the first criterion may be determined based on inconsistency between a sample pattern simulated using the sample pattern data and a sample pattern that is actually manufactured on a wafer based on the sample pattern data. For example, a first width W1 may be extracted from a sample pattern simulated based on the sample pattern data, and a second width W2 of a sample pattern manufactured based on the sample pattern data may be measured in operation S101B. For example, the first width of the sample pattern simulated is calculated based on sample pattern data, and the second width of the sample pattern manufactured is measured based on the sample pattern data.

Next, the sample pattern data may be classified into a standard normal group and a standard weak group based on at least one of (1) a difference between the first width W1 and the second width W2, and (2) a ratio of the difference between the first width W1 and the second width W2 with respect to the second width W2 in operation S101C.

For example, the first criterion may be a difference D between the first width W1 of the sample pattern simulated using the sample pattern data and the second width W2 of the sample pattern actually manufactured on a wafer based on the sample pattern data (refer to Formula (1) below). Which of the first width W1 of the simulated sample pattern and the second width W2 of the sample pattern actually manufactured on the wafer is greater or smaller may not be considered here. The first width W1 and the second width W2 may each indicate a width of a horizontal pattern perpendicular to a longitudinal direction in which the pattern extends.

$$D = |W1 - W2| \qquad \text{Formula (1)}$$

The greater the difference D between a first width W1 and a second width W2 of a pattern, the higher a defect probability of the pattern may be. Thus, the sample pattern data may be classified into a standard normal group and a standard weak group based on the difference D between the first width W1 and the second width W2.

In addition, the first criterion may be a ratio R of the difference between the first width W1 and the second width W2 with respect to the second width W2 (refer to Formula (2) below).

$$R = D/W2 \qquad \text{Formula (2)}$$

When the difference D between the first width W1 and the second width W2 is relatively small compared to the second width W2 which is a total width of a pattern, the difference D may not affect a substantial function of the pattern. Thus, the ratio R of the difference D between the first width W1 and the second width W2 with respect to the second width W2 may be a criterion for accurately predicting a defect probability. Thus, the sample pattern data may be classified into a standard normal group and a standard weak group based on the ratio R of the difference D between the first width W1 and the second width W2 with respect to the second width W2.

In addition, the first criterion may be a relational expression in which the difference D between the first width W1 and the second width W2 and the ratio R of the difference D between the first width W1 and the second width W2 with respect to the second width W2 are combined. Thus, the sample pattern data may be classified into a standard normal group and a standard weak group based on the relational expression of the difference D between the first width W1 and the second width W2 and the ratio R of the difference D between the first width W1 and the second width W2 with respect to the second width W2.

While the criterion for classifying the sample pattern data into the standard normal group and the standard weak group is described above, the exemplary embodiment of the present inventive concept is not limited thereto. For example, the sample pattern data may also be classified based on other criteria classifying the same into a standard normal group and a standard weak group with a higher accuracy.

After classifying the sample pattern data into the standard normal group and the standard weak group of operation S101, operation S103 of calculating a normal group determination function and a weak group determination function based on parameters from the standard normal group and standard weak group may be performed.

Referring also to FIG. 3, first, to extract common characteristics of the standard normal group, parameters with respect to a plurality of sample patterns included in the standard normal group may be extracted in operation S103A. Also, to extract common characteristics of the standard weak group, parameters with respect to a plurality of sample patterns included in the standard weak group may be extracted in S103A. Thus, in operation S103A, parameters of each sample included in the standard normal group and parameters of each sample pattern included in the standard weak group may be extracted.

In exemplary embodiment of the present inventive concept, the parameters may be parameters representing image characteristics of an optical image simulated using the sample pattern data. Further, the image parameters may be based on a simulated object pattern based on object pattern data. The image parameters may be at least one of a width of a simulated sample pattern, a log slope of image intensity, a curvature of image intensity, a maximum image intensity, a minimum image intensity, an over-fitting ratio, and a contrast, but are not limited thereto.

The log slope of image intensity may be related to a first derivative of image intensity with respect to a direction perpendicular to a corner of a pattern. The curvature of image intensity may be related to a second derivative of image intensity with respect to a horizontal direction to a corner of a pattern. The maximum and minimum image intensities may be related to maximum and minimum intensities in a range in which patterns occur. The over-fitting ratio may indicate a degree that patterns are intentionally modified due to OPC. The over-fitting ratio may also indicate a difference between an aerial image and a resist image. The contrast may indicate a contrast between an area where patterns are formed and an area where no pattern is formed.

Next, a linear function, for example, a normal group determination function may be calculated by using parameters respectively extracted from sample patterns of the standard normal group in operation S103B. For example, respective parameter values of the sample patterns may be substituted for the linear function of the parameters, and coefficients of the parameters may be determined to calculate a normal group determination function also in operation S103B.

For example, to extract common characteristics of the standard normal group, six image parameters, that is, a width Wsml of a simulated sample pattern, a log slope Islp of image intensity, a curvature Icvt of image intensity, a maximum image intensity Imax, a minimum image intensity Imin, and an over-fitting ratio Ioft, may be used. Further, a, b, c, d, e and f may represent coefficients of the parameters. In this case, a normal group determination function D1 may be a linear function with respect to the above six image parameters (refer to Formula (3) below).

$$D1 = a \times Wsml + b \times Islp + c \times Icvt + d \times Imax + e \times Imin + f \times Ioft \quad \text{Formula (3)}$$

For example, the six image parameters may be extracted from sample patterns included in the standard normal group in operation S103A, and the parameter values of the respective sample patterns may be substituted for the normal group determination function D1 to thereby determine coefficients (e.g., a, b, c, d, e and f) of the parameters. Accordingly, the normal group determination function D1 having common characteristics with respect to the six image parameters of the normal standard group may be calculated in operation S103B.

Likewise, the above six image parameters may be used to extract common characteristics of the standard weak group. In this case, a weak group determination function D2 may be a linear function with respect to the above six image parameters (refer to Formula (4) below).

$$D2 = g \times Wsml + h \times Islp + i \times Icvt + j \times Imax + k \times Imin + l \times Ioft \quad \text{Formula (4)}$$

The six image parameters may be extracted from sample patterns included in the standard weak group in operation S103A, and respective parameter values of the sample patterns may be substituted for the weak group determination function D2 to thereby determine coefficients (e.g., g, h, i, j, k and l) of the parameters. Accordingly, the weak group determination function D2 having common characteristics with respect to the six image parameters of the standard weak group may be calculated in operation S103B.

As described above, an analysis model for extracting a weak pattern may be completed by performing operation S101 of classifying sample data into a standard normal group and a standard weak group and operation S103 of extracting a normal group determination function and a weak group determination function respectively representing the standard normal group and the standard weak group.

While only some operations of modeling an analysis model (operations S101 and S103) are illustrated in the method 100 of forming a pattern of a semiconductor device illustrated in FIG. 1, exemplary embodiments of the present inventive concept are not limited thereto. In some exemplary embodiments of the present inventive concept, the method 100 of forming a pattern of a semiconductor device may further include selectively removing patterns having a low defect probability from the sample pattern data, before operation S103 of calculating a normal group determination function and a weak group determination function. The exemplary embodiment of the present inventive concept including the operation of selectively removing patterns having a low defect probability from the sample pattern data will be described later with reference to FIG. 5.

In addition, in some exemplary embodiments of the present inventive concept, the method 100 of forming a pattern of a semiconductor may further include, after operation S103 of calculating a normal group determination function and a weak group determination function, verifying the normal group determination function and the weak group determination function. The exemplary embodiment of the present inventive concept including the operation of verifying the normal group determination function and the weak group determination function will be described later with reference to FIG. 8.

After completing the analysis model, operations S105 and S107 of classifying a weak pattern from among an object pattern may be performed by using the analysis model. Operations S105 and S107 of extracting a weak pattern from an object pattern may include operation S105 of calculating a first proximity between the normal group determination function and object pattern data and a second proximity between the weak group determination function and object pattern data by calculating the parameter of the object data, and operation S107 of classifying object pattern data into a normal group and a weak group based on the first and second proximities.

For example, the object pattern data may be data about patterns of a semiconductor device to be manufactured. The object pattern data may be data designed based on Electronic design Automation (EDA), Computer Aided Design (CAD), and other integrated circuit design software or the like. Also, the object pattern data may be OPCed data. Accordingly, the OPCed sample pattern data may include pattern shapes of a target pattern to or from which sub-resolution patterns are added or removed. For example, besides the forming of patterns on the sample pattern data, OPC such as line end treatment or insertion of scattering bars may be performed on the sample pattern data.

With respect to a plurality of object patterns of the object pattern data, parameter values corresponding to parameters of the normal group determination function D1 and the weak group determination function D2 may be respectively calculated. According to the above-described example, in regard to the plurality of object patterns, parameter values of six image parameters of a simulated sample pattern, that is, a width Wsml, a log slope Islp of image intensity, a curvature of image intensity Icvt, a maximum image intensity Imax, a minimum image intensity Imin, and an over-fitting ratio Ioft of the simulated sample pattern may be calculated. The calculation of the parameter values may be performed under simulation based on the object pattern data.

Next, a first proximity between the normal group determination function D1 and the parameter values may be calculated by calculating the parameter of object pattern data in operation S105. In addition, a second proximity between the weak group determination function D2 and the parameter values may be calculated by calculating the parameter of the object pattern data in operation S105. That is, whether characteristics of the object pattern are close to the common characteristics of the normal group determination function D1 or the common characteristics of the weak group determination function D2 may be determined.

In operation S107, the object pattern data is classified into the normal group and weak group. For example, when the first proximity is greater than the second proximity, the object pattern may be classified as a normal group in operation S107. In addition, when the second proximity is greater than the first proximity, the object pattern may be classified as a weak group in operation S107. Operation S107 of classifying is individually performed on each of a plurality of object patterns of the object pattern data. Accordingly, weak patterns may be selected all at one time from the plurality of object patterns of the object pattern data via a numerical analysis model.

In general, an operation of determining whether to print all patterns accurately may be performed when designing pattern data. That is, an operation such as OPC for enhanced optical resolution or pattern transfer reliability, design rule checking (DRC), optical rule checking (ORC), or selection of weak patterns may be performed.

In the operation of selecting a weak point, a weak point with a highest potential defect probability of a pattern may be selected in an actual lithography process within OPCed pattern data. In general, the weak point may be, for example, a point where a pinch defect indicating interrupted patterns in a pattern layout or a bridge defect indicating connection between adjacent patterns are highly likely to occur. Examples of methods of selecting the weak point may include sequentially arranging numerical values of minimum widths of patterns and selecting points where a pattern minimum width is equal to or lower than a predetermined level, or selecting a point with a high defect probability based on an engineer's experience, or selecting a point where a defect has been previously generated.

However, according to selection based on the numerical values of minimum widths of patterns, defects that may occur when a pattern width is broad may not be selected. In other words, defects that may occur between tips of bar-shaped patterns, such as tip to tip, may not be selected as weak points. Also, selection based on engineer's experience may not induce objective criteria regarding defects, and according to selection based on previous defective points, weak points having a new type of defect may not be selected.

However, according to the method 100 of forming a pattern of a semiconductor device according to an exemplary embodiment of the present inventive concept, common characteristics between a defective pattern of pattern data and a defective pattern manufactured according to the defective pattern may be extracted using a mathematical method so as to determine a potential weak pattern based on an objective criterion. Accordingly, an objective criterion for selecting a weak point may be provided, and a new type of weak points may be selected efficiently and accurately.

Further, when an object pattern is actually manufactured on a wafer based on object pattern data in a subsequent process, a pattern defect test may be conducted selectively on weak points selected with a relatively high accuracy instead of all points on the wafer or incorrectly selected weak points. Thus, a process development period of a new semiconductor device may be shortened, and the costs for manufacturing a photomask may be reduced.

Moreover, the selected weak points may be arranged in a descending order of a defect probability thereof, and thus, a period or degree of testing a pattern defect may be adjusted.

While only some operations of classifying a weak pattern from an object pattern by using the analysis model (operations S105 and S107) are illustrated in the method 100 of forming a pattern of a semiconductor device illustrated in FIG. 1 according to an exemplary embodiment of the present inventive concept, the exemplary embodiment is not limited thereto. In some exemplary embodiments of the present inventive concept, operation S107 of classifying object pattern data into a normal group and a weak group in the method 100 of forming a pattern of a semiconductor device may include rearranging weak patterns classified as the weak group from among the object pattern data, in a descending order of a proximity of the weak patterns with respect to a weak group determination function. An exemplary embodiment of the present inventive concept including the operation of rearranging weak patterns classified as the weak group from among the object pattern data, in a descending order of a proximity of the weak patterns with a weak group determination function, will be described later with reference to FIG. 6.

In addition, in some exemplary embodiments of the present inventive concept, the method 100 of forming a pattern of a semiconductor device may further include, before operation S105 of calculating a proximity between the normal determination function or the weak group determination function and the object pattern data, performing OPC on preliminary object pattern data designed according to an object circuit, performing ORC to select preliminary weak pattern data from the OPCed object pattern data, and classifying into a normal group and a weak group may be performed according to operation S107 on the preliminary weak pattern data and not on the object pattern data. Thus, as selecting a weak pattern is performed a second time on the preliminary weak pattern data that is selected a first time in the ORC operation, accuracy of selecting a weak pattern may be improved. In addition, weak patterns of the preliminary weak pattern data may be rearranged according to a descending order of a proximity of the weak patterns with respect to the weak group determination function. The exemplary embodiment of the present inventive concept including the above operations will be described later with reference to FIG. 7.

Figure 4:
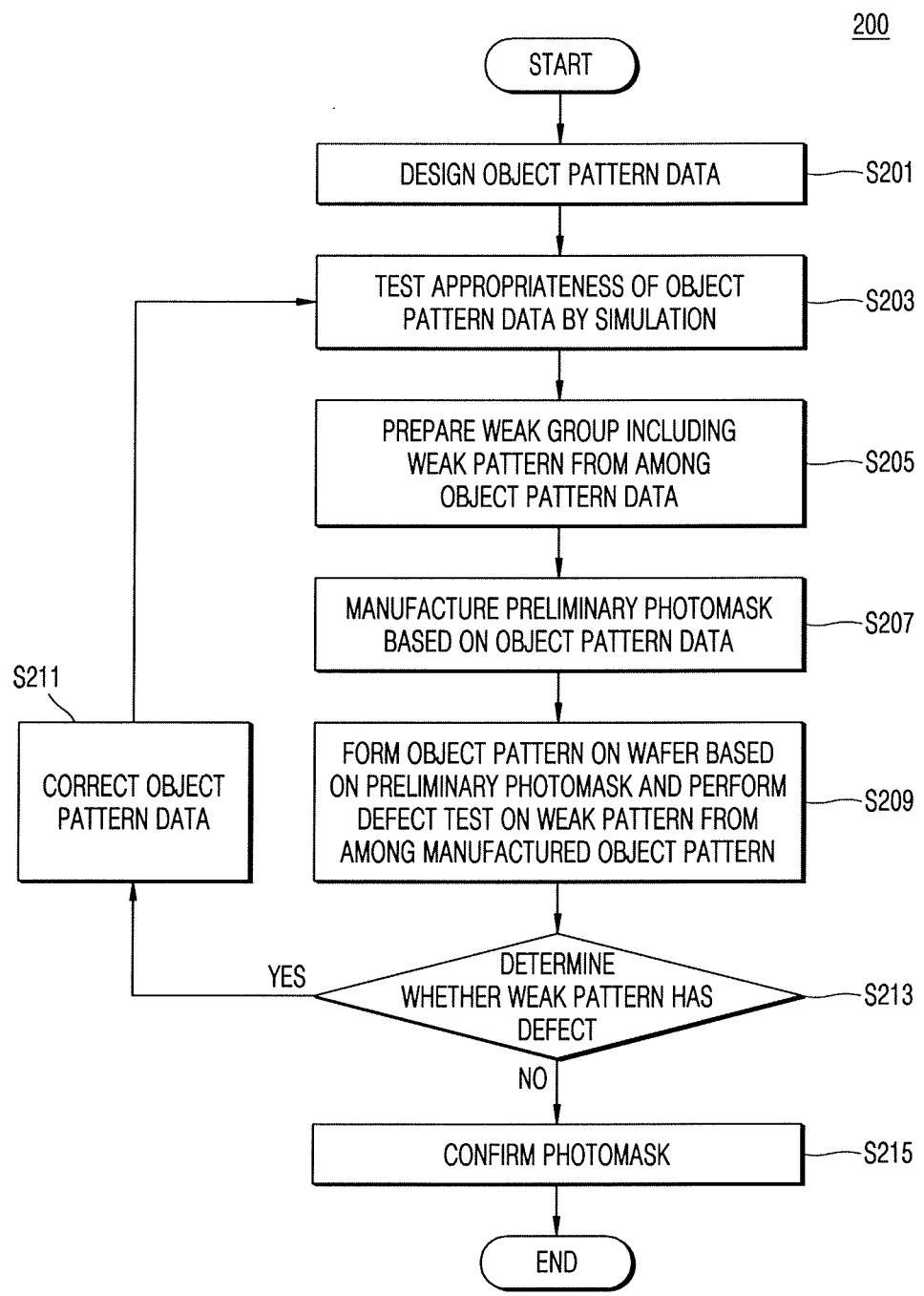
FIGS. 4, 5, 6, 7, 8, 9 and 10 are flowcharts of a method of forming a pattern of a semiconductor device according to exemplary embodiments of the present inventive concept.

FIG. 4 is a flowchart of a method 200 of forming a pattern of a semiconductor device according to exemplary embodiments of the present inventive concept. Operation S205 of preparing a weak group of object pattern data of FIG. 4 may be performed by operations S101, S103, S105, and S107 described with reference to FIG. 1.

Referring to FIG. 4, first, object pattern data of an integrated circuit of a semiconductor device may be designed in operation S201. For example, the object pattern data may be data about a plurality of layouts of each layer of the integrated circuit.

Next, appropriateness of object pattern data may be tested by simulation or the like in operation S203. For example, DRC for testing whether an object pattern of a target integrated circuit is abnormal or not may be performed. Then, OPC may be performed to enhance an optical resolution and pattern transfer reliability of the object pattern. Also, ORC in which a bias amount of the pattern is tested to determine whether OPC was abnormally conducted or not, may be performed.

After testing appropriateness of the object pattern data, a weak pattern, included in the weak group, with respect to the object pattern data may be selected and prepared in operation S205. As described above, even though the appropriateness test has been conducted on the object pattern data, a defect test may be necessary on an object pattern that is actually manufactured on a wafer based on the object pattern data. However, a range of the manufactured object pattern is broad, and thus, a period of testing may have to be shortened. Accordingly, a pattern or a point with a high defect probability is to be predicted and selectively tested.

In the method 200 of forming a pattern of the semiconductor device according to an exemplary embodiment of the present inventive concept, operation S205 of selecting a weak pattern with respect to the object pattern data may be performed using operations S101 and S103 of modeling an analysis model and operations S105 and S107 of actually extracting a weak pattern by using the analysis model, described with reference to FIG. 1 according to exemplary embodiments of the present inventive concept.

That is, referring to FIG. 1 again, first, sample pattern data is classified into a standard normal group and a standard weak group based on a first criterion in operation S101. Next, an image parameter may be calculated with respect to each piece of sample pattern data included in the standard normal group to calculate a normal group determination function, and the image parameter may be calculated with respect to each piece of the sample pattern data included in the standard weak group to calculate a weak group determination function in operation S103. The normal group determination function and weak group determination function may be calculated based on their respectively calculated image parameter. Accordingly, an analysis model for selecting a weak pattern may be completed.

Next, the image parameter is calculated with respect to object pattern data. Next, a first proximity between the normal group determination function and the object pattern data and a second proximity between the weak group determination function and the object pattern data are calculated in operation S105. The object pattern data may be classified into a normal group and a weak group based on the first and second proximities in operation S107. Weak patterns and weak points of the object pattern data classified into the weak group may be subject to a defect test in a subsequent process.

Next, a preliminary photomask including an object pattern may be manufactured based on the object pattern data in operation S207.

Next, the object pattern is formed on a wafer by using the preliminary photomask, and a defect test is performed on weak patterns and weak points of the object pattern formed on the wafer in operation S209. The weak patterns and the weak points are selected in operation S205 of preparing a weak group described with reference to FIG. 1.

Whether the weak patterns have a defect may be determined in the defect test of operation S213. If no defect is found in the object patterns, the preliminary photomask manufactured based on initial object pattern data may be confirmed as a photomask in operation S215. Accordingly, a manufacturing process of a target semiconductor device may be performed based on the photomask. However, if a defect is found in the object patterns, object pattern data based on the object patterns having the defect may be corrected in operation S211.

Next, appropriateness of the corrected object pattern data may be tested via simulation or the like in operation S203. As described above, DRC, OPC, ORC, or the like may be performed to test appropriateness of the corrected object pattern data, but a method of testing appropriateness of the corrected object pattern data is not limited thereto.

Next, a weak pattern of the corrected object pattern data, on which a defect test is to be performed, may be prepared in operation S205. When preparing a weak pattern with respect to the corrected object pattern data, patterns determined to have a defect and patterns adjacent to these patterns determined to have a defect from among the weak patterns of the uncorrected object pattern data may be determined as weak patterns with respect to the corrected object pattern data. Thus, as a detect test has been conducted once on the weak patterns selected based on the uncorrected object pattern data, those patterns determined to have no defect may be excluded from the weak patterns with respect to the corrected object pattern data.

Next, a corrected preliminary photomask may be manufactured again based on the corrected object pattern data in operation S207. Next, an object pattern may be formed on a wafer based on the corrected preliminary photomask, and a defect test may be performed again on weak patterns of the object pattern in operation S209.

Whether the weak patterns on which the defect test of operation S209 has been performed have a defect may be determined in operation S213. As described above, if no defect is found in the corrected object patterns, the preliminary photomask manufactured based on the corrected object pattern data may be confirmed as a photomask in operation S215. However, if a defect is found in the corrected object pattern again, the corrected object pattern data may be corrected again in operation S211. Operation S211 may be repeated until no defect is found in the object pattern manufactured on the wafer.

However, according to the method 200 of forming a pattern of a semiconductor device of an exemplary embodiment of the present inventive concept, common characteristics between a defective pattern of pattern data and a defective pattern manufactured according to this defective pattern may be extracted using a mathematical method so as to select a potential weak pattern objectively and based on an accurate criterion. Accordingly, when selecting a weak pattern, patterns with a low defect probability may be excluded, and a new weak pattern type may also be selected. Accordingly, most defects may be found and object pattern data may be corrected in an initial defect test, and thus the manufacturing costs of a photomask and a process development period may be shortened.

Figure 5:
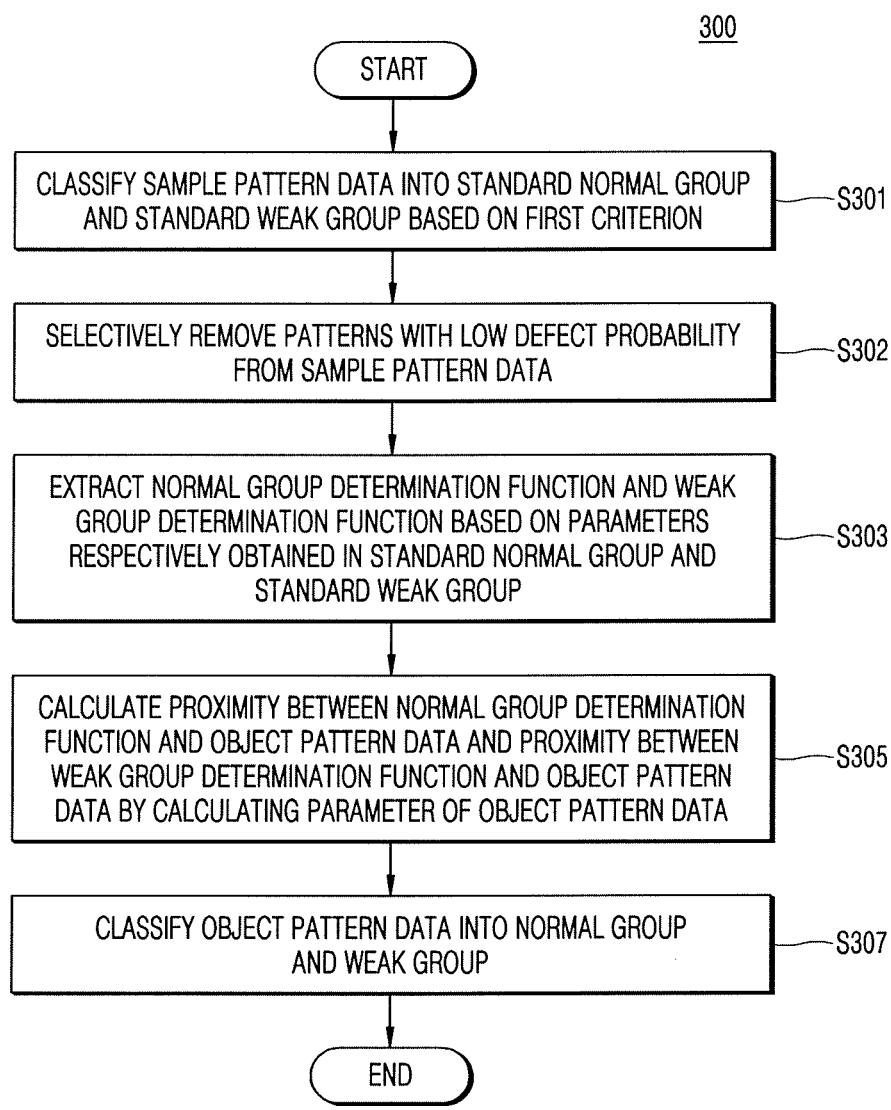

FIG. 5 is a method 300 of forming a pattern of a semiconductor device according to exemplary embodiments of the present inventive concept. The method 300 of FIG. 5 is similar to the method 100 of forming a pattern of a semiconductor device of FIG. 1, but may further include, before operation S303 of calculating a normal group determination function and a weak group determination function, operation S302 of selectively removing patterns with a low defect probability from the sample pattern data.

Referring to FIG. 5, first, sample pattern data may be classified into a standard normal group and a standard weak group based on a first criterion in operation S301.

Next, patterns having a low defect probability may be selectively removed from the sample pattern data in operation S302. The removing operation S302 may be performed on each of the standard normal group and the standard weak group. When removing patterns with a low defect probability, over-fitting of the normal group determination function and the weak group determination function may be resolved. That is, characteristics of each of the normal group determination function and the weak group determination function may be rendered more distinctively. Thus, the operation of classifying object pattern data into a normal group or a weak group may be performed easily and with a high accuracy.

Next, in operation S303, a normal group determination function and a weak group determination function may be calculated based on the parameters respectively extracted from the standard normal group and the standard weak group in operation S303. Next, a parameter of the object pattern data may be calculated to calculate a first proximity between the normal group determination function and the object pattern data and a second proximity between a weak group determination function and the object pattern data in operation S305. A plurality of object patterns included in the object pattern data may be classified into a normal group and a weak group based on the first and second proximities in operation S307.

Figure 6:
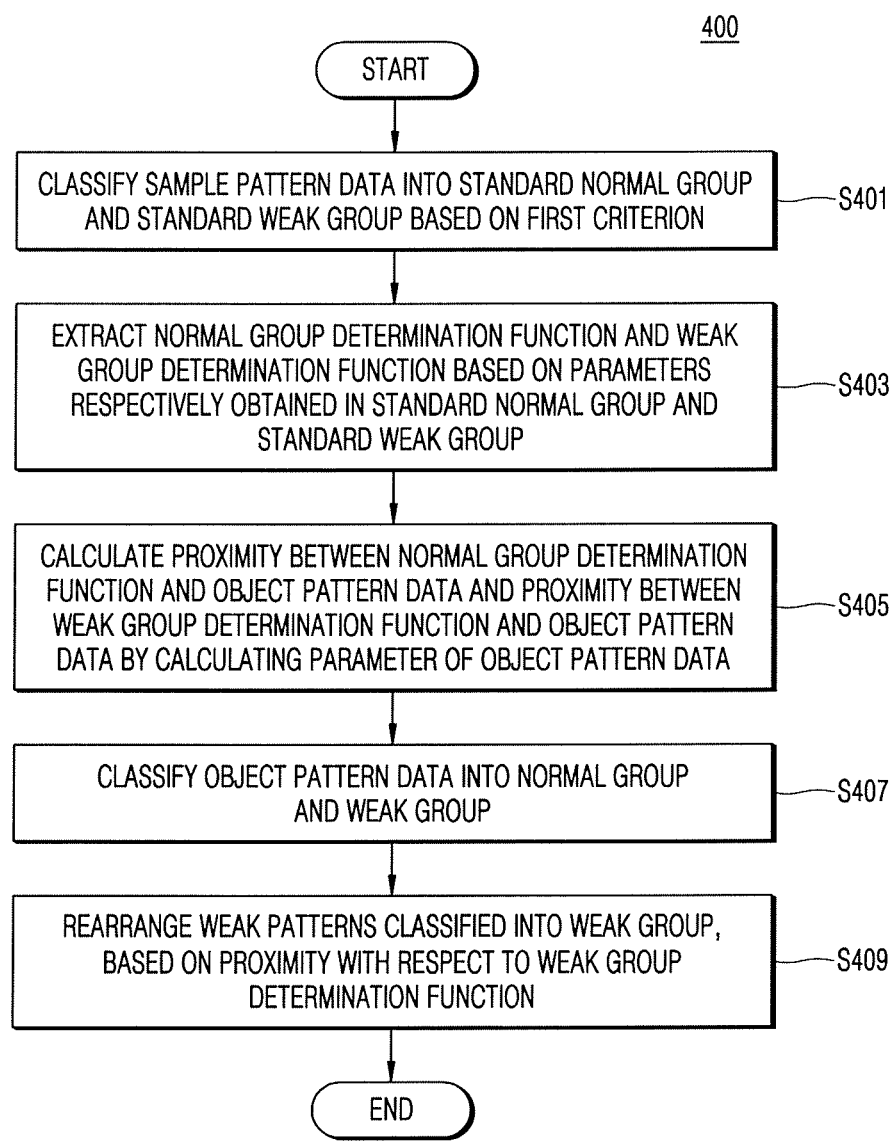

FIG. 6 is a flowchart of a method 400 of forming a pattern of a semiconductor device according to exemplary embodiments of the present inventive concept. The method 400 of FIG. 6 is similar to the method 100 of forming a pattern of a semiconductor device of FIG. 1, but may further include, after operation S407 of classifying object pattern data into a normal group and a weak group, operation S409 of rearranging weak patterns classified as the weak group based on a proximity between the weak group determination function and the object pattern data (operation S405) with respect to a weak group determination function.

Referring to FIG. 6, first, sample pattern data may be classified into a standard normal group and a standard weak group based on a first criterion in operation S401. Next, a normal group determination function and a weak group determination function may be calculated based on parameters respectively extracted from the standard normal group and the standard weak group in operation S403. Next, a first proximity between the normal group determination function and object pattern data and a second proximity between the weak group determination function and object pattern data may be calculated by calculating parameters of object pattern data in operation S405. A plurality of object patterns included in the object pattern data may be classified into a normal group and a weak group based on the first and second proximities in operation S407.

Next, weak patterns classified into the weak group may be rearranged based on the second proximity with respect to the weak group determination function in operation S409. Accordingly, a defect test on weak patterns with a higher defect probability from among weak patterns belonging to the same weak group may be performed without omission.

Figure 7:
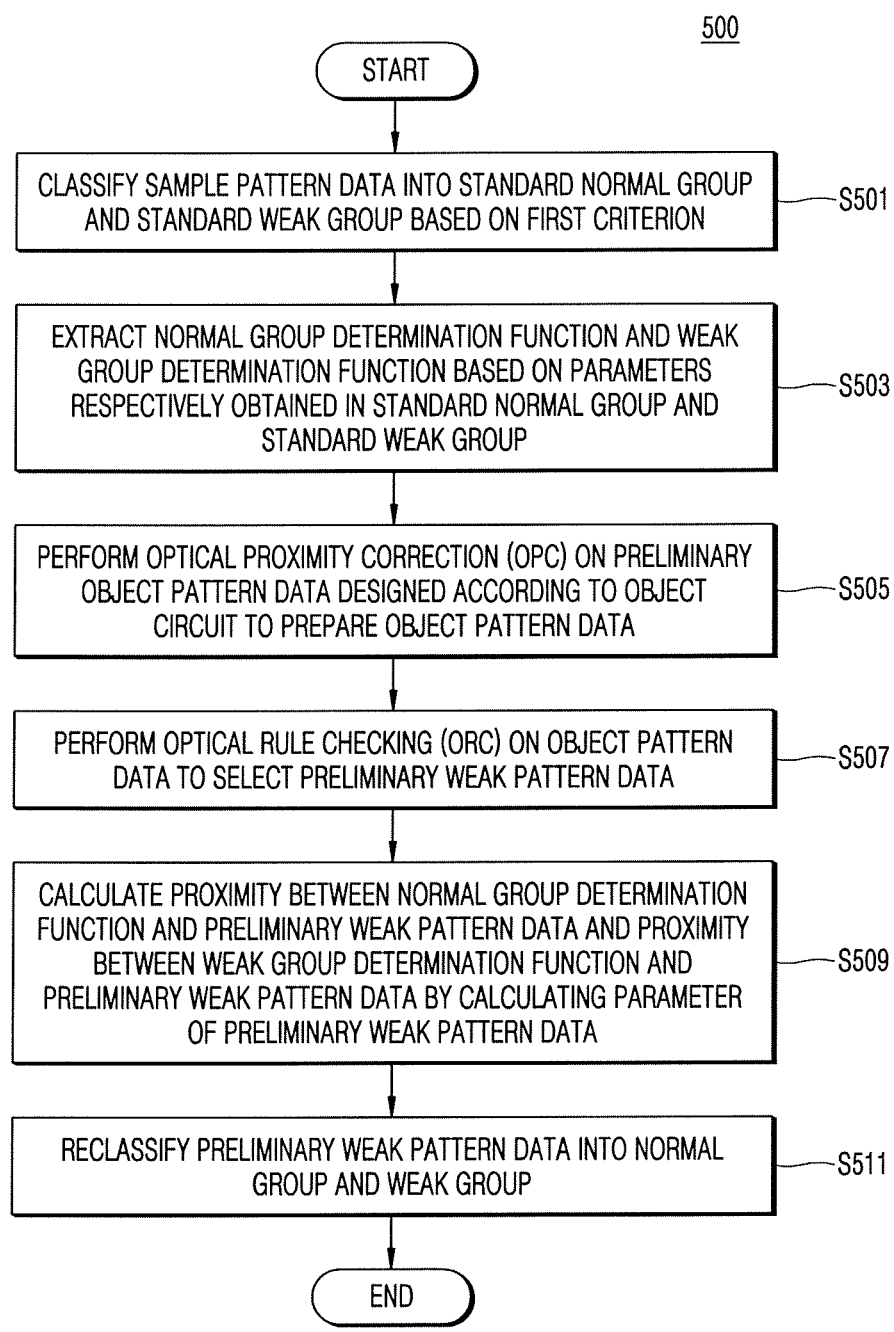

FIG. 7 is a flowchart of a method 500 of forming a pattern of a semiconductor device according to exemplary embodiments of the present inventive concept. The method 500 of FIG. 7 is similar to the method 100 of forming a pattern of a semiconductor device of FIG. 1, except that an object from which a weak pattern is selected, is preliminary weak pattern data that is determined as a weak pattern at a first time by using a different selection method.

Referring to FIG. 7, first, sample pattern data may be classified into a standard normal group and a standard weak group based on a first criterion in operation S501. Next, a normal group determination function and a weak group determination function may be calculated based on parameters respectively extracted from the standard normal group and the standard weak group in operation S503.

Next, OPC may be performed on preliminary object pattern data designed according to an object circuit to prepare object pattern data in operation S505. Next, ORC may be further performed on the object pattern data to select preliminary weak pattern data in operation S507.

Next, a parameter of the preliminary weak pattern data may be calculated to calculate a first proximity between the normal group determination function and the preliminary weak pattern data and a second proximity between the weak group determination function and the preliminary weak pattern data in operation S509. The preliminary weak pattern data may be rearranged (or reclassified) into a normal group and a weak group based on the first and second proximities in operation S511.

Accordingly, as operations S509 and S511 of selecting a weak pattern are performed a second time on the preliminary weak pattern data selected a first time in the ORC operation, accuracy of selecting a weak pattern may be improved. In addition, weak patterns of the preliminary weak pattern data may be rearranged in a descending order of a proximity of the weak patterns with respect to the weak group determination function.

Figure 8:
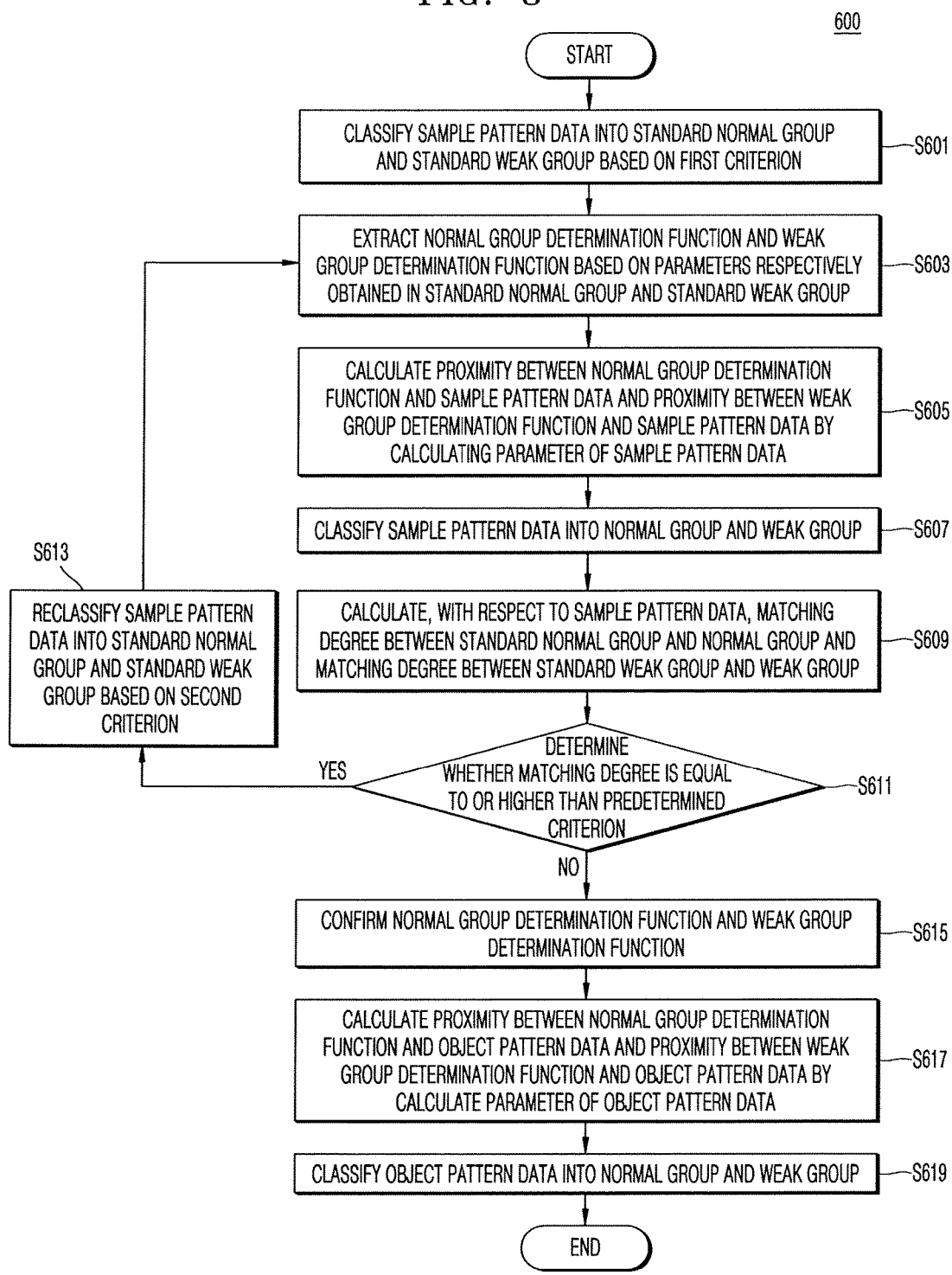
Figure 9:
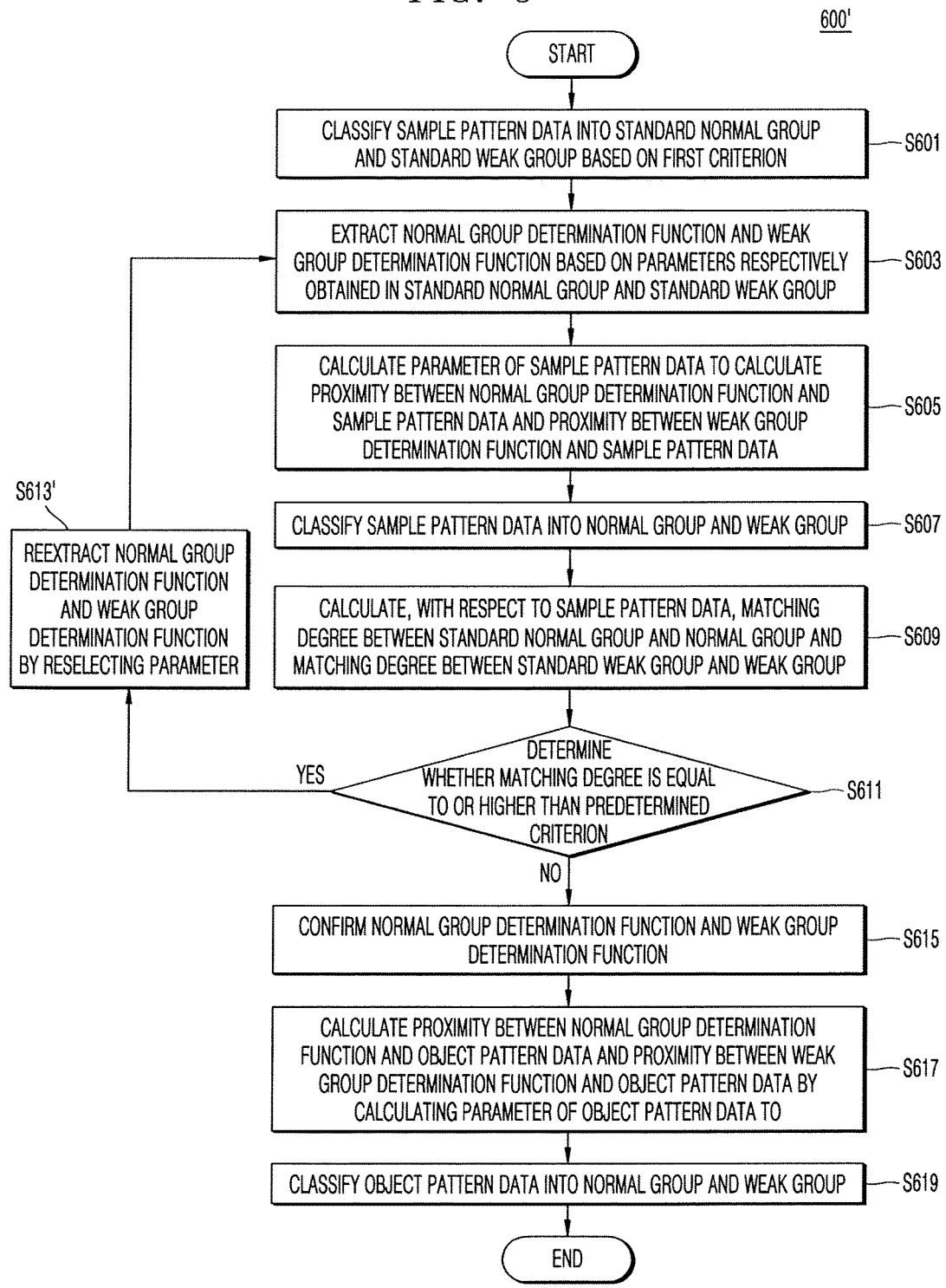

FIG. 8 is a flowchart of a method 600 of forming a pattern of a semiconductor device according to exemplary embodiments of the present inventive concept. The method 600 of FIG. 8 is similar to the method 100 of forming a pattern of a semiconductor device of FIG. 1, but may further include, after operation S603 of calculating a normal group determination function and a weak group determination function, operations S605, S607, S609, S611, S613, and S615 for verifying the normal group determination function and the weak group determination function. FIG. 9 is a flowchart of a method 600' of forming a pattern of a semiconductor device according to exemplary embodiments of the present inventive concept. The method 600' of FIG. 9 is similar to the method 600 of FIG. 8 of forming a pattern of a semiconductor device, except that the method 600' includes operation S613' of recalculating the normal group determination function and the weak group determination function by reselecting a parameter to recalculate a normal group determination function and a weak group determination function.

Referring to FIG. 8, first, sample pattern data may be classified into a standard normal group and a standard weak group based on a first criterion in operation S601. Next, a normal group determination function and a weak group determination function may be respectively calculated based on parameters respectively extracted from the standard normal group and the standard weak group in operation S603.

Next, operations S605, S607, S609, S611, S613, and S615 of verifying the normal group determination function and the weak group determination function may be performed. In the verifying operations, operations S605 through S615, whether the normal group determination function and the weak group determination function are adequate analysis models to classify a normal group and a weak group are determined. In the verifying operations of operations S605 through S615, a weak group is classified by applying the normal group determination function and the weak group determination function to sample pattern data whose standard weak group is already known, and by comparing a matching degree between the standard weak group and the weak group.

For example, parameters of the normal group determination function and the weak group determination function may be respectively calculated with respect to a plurality of object patterns of the sample pattern data to calculate a first proximity between each of the plurality of object patterns and the normal group determination function and a second proximity between each of the plurality of object patterns and the weak group determination function in operation S605. The plurality of object patterns may be classified into the normal group and the weak group based on the first and second proximities in operation S607.

Next, with respect to the plurality of object patterns of the sample pattern data, a first matching degree between the standard normal group and the normal group and a second matching degree between the standard weak group and the weak group may be calculated in operation S609. Next, whether one of the first and second matching degrees falls short of a preset predetermined criterion may be determined in operation S611.

When both of the first and second matching degrees are equal to or higher than the predetermined criterion, the normal group determination function and the weak group determination function may be confirmed as an analysis model in operation S615. Accordingly, parameters may be respectively calculated with respect to a plurality of object patterns of object pattern data to calculate a first proximity between the normal group determination function and the object pattern data and a second proximity between the weak group determination function and the object pattern data in operation S617. Also, each of the object patterns of the object pattern data may be classified into a normal group or a weak group based on the first and second proximities in operation S619.

However, when one of the first and second matching degrees falls short of the predetermined criterion, operation S613 of reclassifying the sample pattern data into a standard normal group and a standard weak group based on a second criterion may be performed.

Referring to FIG. 9, when at least one of the first and second matching degrees falls short of the predetermined criterion, instead of operation S613 of reclassifying the sample pattern data into a standard normal group and a standard weak group based on the second criterion, operation S613' of reselecting a parameter to recalculate a normal group determination function and a weak group determination function may be performed.

Referring to FIG. 8 again, after operation S613 of reclassifying the standard normal group and the standard weak group, a normal group determination function and a weak group determination function may be recalculated from the reclassified standard normal group and the reclassified standard weak group in operation S603.

Next, the verifying operations, operations S605, S607, S609, and S611, may be performed again on the recalculated normal group determination function and the recalculated weak group determination function. When the recalculated normal group determination function and the recalculated weak group determination function are equal to or higher than a predetermined criterion, the normal group determination function and the weak group determination function may be confirmed in operation S615. Next, a parameter of object pattern data may be calculated to calculate a first proximity between the normal group determination function and the object pattern data and a second proximity between the weak group determination function and the object pattern data in operation S617. A plurality of object patterns of the object pattern data may be classified into a normal group and a weak group based on the first and second proximities in operation S619.

Figure 10:
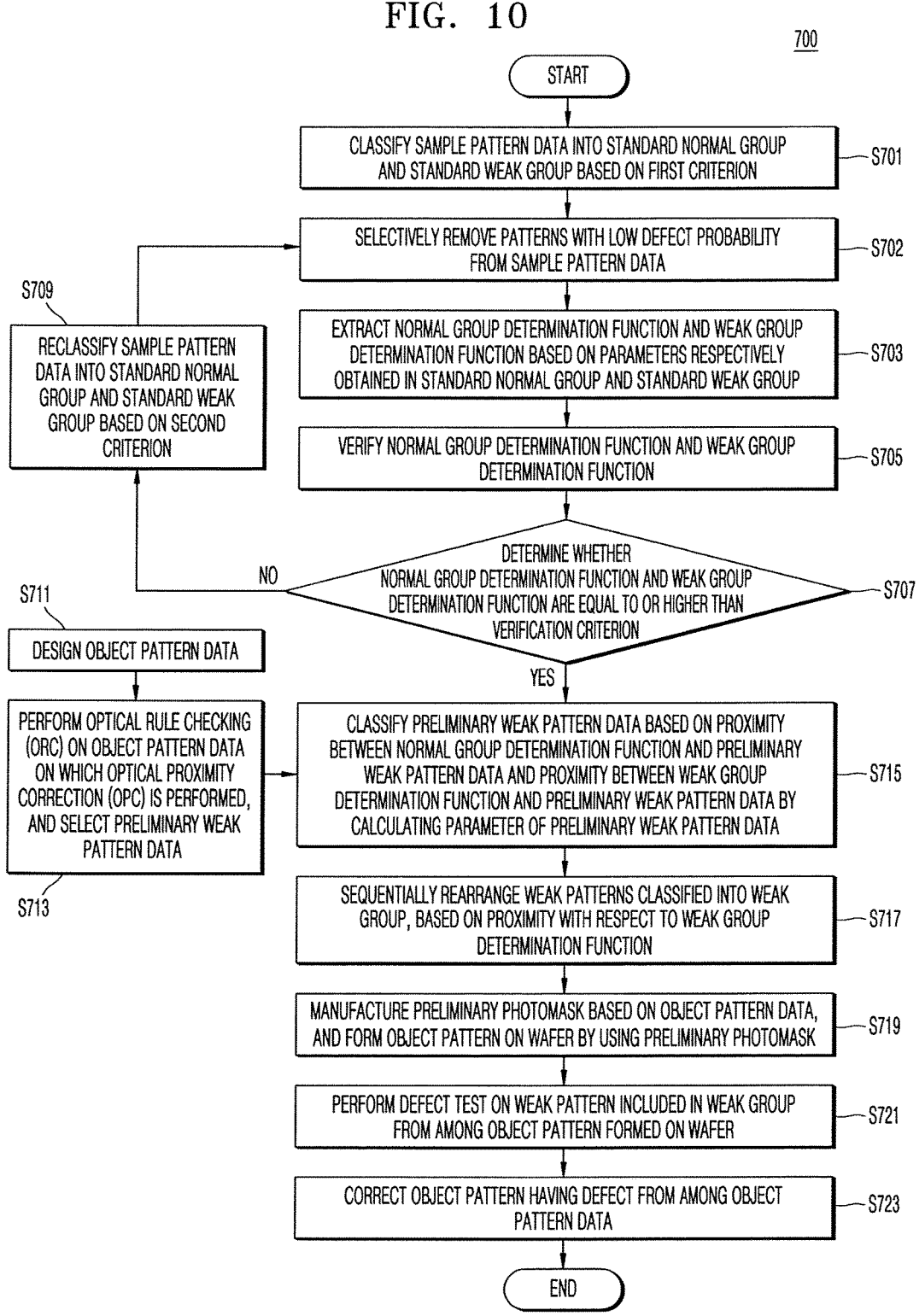

FIG. 10 is a flowchart of a method 700 of forming a pattern of a semiconductor device according to exemplary embodiments of the present inventive concept. The method 700 of FIG. 10 of forming a semiconductor device includes all of the operations of the methods 100, 200, 300, 400, 500, and 600 of forming a pattern of a semiconductor device illustrated in FIGS. 1 through 8 according to exemplary embodiments of the present inventive concept.

Referring to FIG. 10, sample pattern data may be classified into a standard normal group and a standard weak group based on a first criterion in operation S701. The first criterion is as described with reference to FIG. 1. In this case, patterns with a low defect probability may be selectively removed from the sample pattern data in operation S702.

A normal group determination function and a weak group determination function may be calculated based on the parameters respectively extracted from the standard normal group and the standard weak group in operation S703. For example, the parameter may be image parameters as described above with reference to FIG. 1 according to an exemplary embodiment of the present inventive concept.

Next, whether the normal group determination function and the weak group determination function are appropriate may be verified in operation S705. The verifying operation S705 may be performed according to the verifying operations: operations S605, S607, and S609, described with reference to FIG. 8.

Next, the determination of whether the normal group determination function and the weak group determination function are equal to or higher than a verification criterion may be performed in operation S707. When the normal group determination function and the weak group determination function are less than the verification criterion, the sample pattern data may be reclassified into a standard normal group and a standard weak group based on a second criterion in operation S709. For example, the second criterion may be different from the first criterion. While a method of correcting the standard normal group and the standard weak group to correct the normal group determination function and the weak group determination function is described with reference to FIG. 10, exemplary embodiments of the present inventive concept are not limited thereto. In some exemplary embodiments of the present inventive concept, to correct the normal group determination function and the weak group determination function, instead of operation S709 of reclassifying the sample pattern data into a standard normal group and a standard weak group based on the second criterion, an operation of reselecting a parameter to recalculate a normal group determination function and a weak group determination function may be performed.

When the normal group determination function and the weak group determination function are equal to or higher than the verification criterion, the normal group determination function and the weak group determination function may be confirmed as an analysis model in operation S707.

Next, operations of selecting a weak pattern from object pattern data may be performed using the analysis model. First, object pattern data is designed in operation S711. Here, OPC and ORC may be performed on the object pattern data in operation S713. As a result of the ORC, preliminary weak pattern data may be selected from the object pattern data.

Next, a parameter value of the preliminary weak pattern data may be extracted. Next, based on a first proximity between the normal group determination function and the preliminary weak pattern data and a second proximity between the weak group determination function and the preliminary weak pattern data, the preliminary weak pattern data may be classified into a normal group and a weak group in operation S715. Weak patterns classified into the weak group may be rearranged sequentially based on the second proximity with respect to the weak group determination function in operation S717. By applying the analysis model to data that is once selected as a weak pattern already by ORC, only weak patterns having a defect probability may be selected with a high accuracy. That is, weak patterns that have been omitted in the ORC may be included as weak patterns with a low ranking, and weak patterns that are selected twice both in the ORC and by the analysis model may be selected as weak patterns of a high ranking.

In addition, a preliminary photomask may be manufactured based on the object pattern data, and an object pattern may be formed on a wafer by using the preliminary photomask in operation S719.

Next, a defect test may be performed on weak patterns included in a weak group from among the object pattern formed on the wafer in operation S721. For example, the weak patterns may be those found in operation S717 of sequentially rearranging the weak patterns into a weak group. Next, when a defect is found in the object pattern data, the object pattern data may be corrected in operation S723. After correcting the object pattern data, testing appropriateness of the corrected object pattern data, reselecting a weak pattern, remanufacturing a preliminary photomask, and forming a corrected object pattern on a wafer may be further performed, and description of these operations is as provided with reference to FIG. 4 according to an exemplary embodiment of the present inventive concept.

Figure 11:
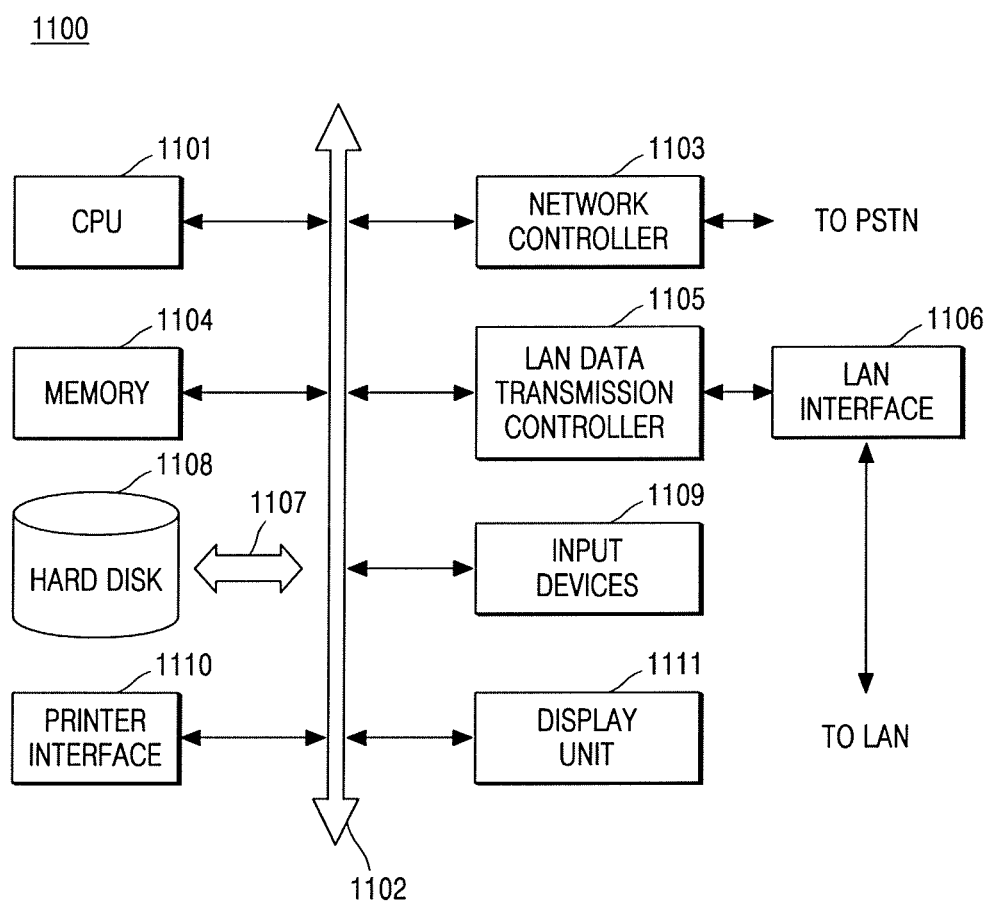
FIG. 11 illustrates an example of a computer system capable of implementing the method according to an exemplary embodiment of the present inventive concept.

FIG. 11 illustrates an example of a computer system capable of implementing the method according to an exemplary embodiment of the present inventive concept. The method according to an exemplary embodiment may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1100 may include, for example, a central processing unit (CPU) 1101, random access memory (RAM) 1104, a printer interface 1110, a display unit 1111, a local area network (LAN) data transmission controller 1105, a LAN interface 1106, a network controller 1103, an internal bus 1102, and one or more input devices 1109, for example, a keyboard, mouse etc. As shown, the system 1100 may be connected to a data storage device, for example, a hard disk, 1108 via a link 1107.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the inventive concept has been particularly shown and described with reference to exemplary embodiments of the present inventive concept thereof, it will be understood that various changes in form and details may be made therein without departing from the spirit and scope of the following claims.

What is claimed is:

1. A method of forming a pattern of a semiconductor device, the method comprising:
classifying sample pattern data into a standard normal group and a standard weak group based on a first criterion;
extracting a normal group determination function by calculating an image parameter with respect to each piece of sample pattern data included in the standard normal group, and extracting a weak group determination function by calculating the image parameter with respect to each piece of sample pattern data included in the standard weak group;
classifying an object pattern data into a normal group and a weak group by calculating the image parameter with respect to object pattern data based on a first proximity between the normal group determination function and the object pattern data, and a second proximity between the weak group determination function and the object pattern data;
forming an object pattern based on the object pattern data on a wafer; and
performing a defect test on the patterned wafer based on object pattern data classified in the weak group.

2. The method of claim 1, wherein in the classifying of the sample pattern data into the standard normal group and the standard weak group, the first criterion is at least one of a difference between a first width of a sample pattern simulated using the sample pattern data and a second width of a sample pattern that is actually manufactured based on the sample pattern data and a ratio of the difference between the first and second widths with respect to the second width.

3. The method of claim 1, wherein the image parameter is a parameter indicating image characteristics of a simulated sample pattern based on the sample pattern data and a simulated object pattern based on the object pattern data.

4. The method of claim 3, wherein the image parameter is at least one of a width, a log slope of image intensity, a curvature of image intensity, a maximum image intensity, a minimum image intensity, an over-fitting ratio, and a contrast of the simulated sample pattern or the simulated object pattern.

5. The method of claim 1, further comprising, before extracting the normal group determination function and the weak group determination function, selectively removing patterns having a low defect probability from the sample pattern data.

6. The method of claim 1, wherein the classifying of the object pattern data into a normal group and a weak group further comprises rearranging weak patterns of the object pattern data that are classified into the weak group in a descending order of the second proximity.

7. The method of claim 1, further comprising:
manufacturing a preliminary photomask actually including an object pattern based on the object pattern data, wherein the object pattern is formed on the wafer by using the preliminary photomask, and the defect test is preformed on a weak pattern included in the weak group from among the object pattern formed on the wafer.

8. The method of claim 1, further comprising, before classifying the object pattern data into a normal group and a weak group, performing optical proximity correction (OPC) on preliminary object pattern data designed according to an object circuit,
wherein the object pattern data is generated by performing OPC on the preliminary object pattern data.

9. The method of claim 8, further comprising, between the performing the OPC and the classifying the object pattern data into a normal group and a weak group, performing optical rule checking (ORC) on the object pattern data to select preliminary weak pattern data.

10. The method of claim 9, wherein the classifying the object pattern data into a normal group and a weak group is performed on the preliminary weak pattern data, and comprises rearranging weak patterns classified into the weak group from among the preliminary weak pattern data in a descending order of the second proximity.

11. The method of claim 1, further comprising, after the extracting the normal group determination function and the weak group determination function, verifying the normal group determination function and the weak group determination function,
wherein the verifying of the normal group determination function and the weak group determination function comprises calculating the image parameter with respect to the sample pattern data to classify the sample pattern data into a normal group and a weak group based on a proximity between the sample pattern data and the normal group determination function and a proximity between the sample pattern data and the weak group determination function.

12. The method of claim 11, further comprising determining a first matching degree between the standard normal group and the normal group and a second matching degree between the standard weak group and the weak group with respect to the sample pattern data.

13. The method of claim 12, further comprising, when one of the first and second matching degrees falls short of a preset criterion, reextracting a normal group determination function and a weak group determination function by reclassifying the sample pattern data into a standard normal group and a standard weak group based on a second criterion.

14. The method of claim 12, further comprising, when one of the first and second matching degrees falls short of a preset criterion, reextracting a normal group determination function and a weak group determination function by reselecting an image parameter.

15. A method of manufacturing a pattern of a semiconductor device, the method comprising:
classifying sample pattern data into a standard normal group and a standard weak group based on a first criterion;
removing pattern data with a low defect probability from sample patterns included in the standard normal group and the standard weak group;
respectively extracting a normal group determination function and a weak group determination function based on image parameters from the standard normal group and the standard weak group;
respectively calculating a first matching degree between the standard normal group and a normal group and a second matching degree between the standard weak group and a weak group, by classifying the sample pattern data into a normal group and a weak group based on the normal group determination function and the weak group determination function;
reclassifying a standard normal group and a standard weak group based on a second criterion that is different from the first criterion and reextracting a normal group determination function and a weak group determination function from the reclassified standard normal group and the reclassified standard weak group when one of the first and second matching degrees is less than a preset criterion;

performing optical rule checking (ORC) on object pattern data, on which optical proximity correction (OPC) is performed, and selecting preliminary weak pattern data from the object pattern data;

classifying the preliminary weak pattern data into a normal group and a weak group based on a proximity between the normal group determination function and the preliminary weak pattern data and a proximity between the weak group determination function and the preliminary weak pattern data by calculating an image parameter with respect to the preliminary weak pattern data;

forming a preliminary photomask based on the object pattern data, and forming an object pattern on a wafer by using the preliminary photomask;

testing each weak pattern included in the weak group from among the object pattern formed on the wafer for a defect; and correcting object pattern data based on the testing.

16. A method of manufacturing a pattern of a semiconductor device, the method comprising:

testing object pattern data for abnormality;

classifying sample pattern data into a standard normal group and a standard weak group based on a first criterion;

extracting a normal group determination function by calculating an image parameter with respect to each piece of sample pattern data included in the standard normal group, and extracting a weak group determination function by calculating the image parameter with respect to each piece of sample pattern data included in the standard weak group;

performing optical rule checking (ORC) on object pattern data, on which optical proximity correction (OPC) is performed to select preliminary weak pattern data;

reclassifying the preliminary weak pattern data into a normal group and a weak group based on a first proximity between the normal group determination function and the selected preliminary weak pattern data and a second proximity between the weak group determination function and the preliminary weak pattern data by calculating the image parameter with respect to the preliminary weak pattern data;

manufacturing a preliminary photomask based on the object pattern data, forming object patterns on a wafer based on the preliminary photomask, and performing defect test on weak patterns among the object patterns responding to the weak group; and determining whether the weak patterns have a defect, wherein when there is no defect in the object patterns, a preliminary photomask is confirmed, and when there is a defect in the object patterns, the object pattern based on the object patterns having the defect are corrected.

17. The method of claim 16, wherein in the classifying of the sample pattern data into the standard normal group and the standard weak group, the first criterion is at least one of a difference between a first width of a sample pattern simulated using the sample pattern data and a second width of a sample pattern that is manufactured based on the sample pattern data and a ratio of the difference between the first and second widths with respect to the second width.

18. The method of claim 16, wherein the weak patterns of the preliminary weak pattern data are rearranged in a descending order of the second proximity.

19. The method of claim 16, wherein the image parameter is a parameter indicating image characteristics of a simulated sample pattern based on the sample pattern data and a simulated object pattern based on the object pattern data.

\* \* \* \* \*